United States Patent Office 3,223,476
Patented Dec. 14, 1965

3,223,476
EXTRACTION OF METAL VALUES FROM ACID SOLUTIONS
James L. Hart, deceased, late of Bartlesville, Okla., by Darall G. Hawk, special administrator, Bartlesville, Okla., assignor to Phillips Petroleum Company, a corporation of Delaware
No Drawing. Filed July 27, 1962, Ser. No. 213,060
8 Claims. (Cl. 23—14.5)

The present invention relates to a process of extracting metal values from aqueous acidic solutions containing molybdenum, singly, or associated with either uranium or vanadium. In another aspect it relates to control of the formation of precipitates of molybdenum in the presence of organo-nitrogen compounds as uranium value extractants.

Various processes are currently in use for recovering molybdenum from acid solutions. Many of these processes are closely associated with the recovery of uranium values since molybdenum and other metals such as vanadium frequently occur in primary and secondary uranium ores and are leached from the ores during processing for recovery of the uranium.

One process which is widely used for the recovery of uranium and associated metal values is the extraction of these values from acid solutions by means of selected amines. The most widely used process of this type is the Amex process which is currently being used in a number of acid leach uranium mills in this country and Canada, and which is described in U.S. Patent No. 2,877,250 to Brown et al. One major difficulty which is encountered in the extraction of uranium from acid solutions by means of amines is that the molybdenum in said solutions forms a complex with the amine extractant which precipitates out of solution. The precipitated complex causes difficulties in pumping, filtration, and even in stripping or recovering the mineral values from the extractant used. While the presence of these solids in the values stripping circuit does not completely stop the operation, many mechanical difficulties arise since the extraction and stripping operations were designed to treat only liquid materials.

It is, therefore, an object of this invention to provide a new process for the recovery of molybdenum from acid solutions. It is a further object to provide a new extractant composition for use in recovering uranium, molybdenum, vanadium, and other extractable metal values from acid solutions. It is a further object to provide a method for preventing the precipitation of molybdenum-amine complexes during the extraction of metal values from acid solutions.

According to the process of this invention, the formation of solid molybdenum/amine complexes during extraction of metal values from an acidic, molybdenum-containing aqueous solution with a solution of an amine extractant, can be minimized by the addition, to said extractant, of an ether of the formula $$R\text{-}(OCH_2CH_2)_m OR'$$

wherein $m$ is an integer selected from the group consisting of 1 and 2, R is a 4 to 6 carbon alkyl radical and R' is selected from the group consisting of hydrogen and a 4 to 6 carbon alkyl radical.

The extractants of the prior art generally comprise a selected organic nitrogen compound dissolved in an organic solvent.

The selected organic nitrogen compounds are represented by the formulas

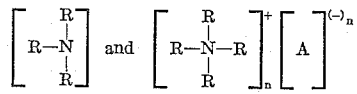

where each R is selected from the group consisting of hydrogen and hydrocarbon radicals selected from the group consisting of alkyl, alkenyl, cycloalkyl, cycloalkenyl, and aryl radicals, and combination thereof such as alkaryl, aralkyl, aralkenyl, alkylcycloalkyl, cycloalkylalkenyl, arylcycloalkyl, cycloalkenylaryl, and the like, wherein at least one R group is a hydrocarbon radical and wherein at least one of said R radicals has at least 8 carbon atoms, and preferably is an alkyl or alkenyl radical having at least 8 carbon atoms, the total number of carbon atoms in the sum of said R radicals being in the range between 11 and 40; A is an anion such as chloride, bromide, iodide, fluoride, hydroxide, sulfate, phosphate, acetate, nitrate, benzoate, salicylate, and the like; and wherein $n$ is an integer equal to the valence of the anion A.

Representative of quaternary ammonium compounds useful in the practice of this invention include: myristyl trimethyl ammonium chloride, stearyl trimethyl ammonium chloride, oleyl trimethyl ammonium chloride, oleyllinoleyl trimethyl ammonium chloride, coconut trimethyl ammonium chloride, monotallow trimethylammonium chloride, dilauryl dimethyl ammonium chloride, dimyristyl dimethyl ammonium chloride, dipalmityl dimethyl ammonium chloride, distearyl dimethyl ammonium chloride, di(oleyl-linoleyl) dimethyl ammonium chloride, dicoconut dimethyl ammonium chloride, dihydrogenated tallow dimethyl ammonium chloride, tricaprylyl monomethyl ammonium chloride, soya-trimethyl ammonium chloride, mixture of soya trimethyl ammonium chloride and dicoconut dimethyl ammonium chloride, dicoconut dimethyl ammonium chloride, dihydrogenated tallow dimethyl ammonium chloride, tallow trimethyl ammonium chloride, lauryl trimethyl ammonium chloride, lauryl trimethyl ammonum chloride, palmityl trimethyl ammonium chloride, and stearyl trimethyl ammonium chloride.

Representative of the primary, secondary, and tertiary amines useful in the practice of this invention include: 1-heptyloctylamine, 1-(3-ethylpentyl)-4-ethyloctylamine, 1-undecyldodecylamine, di-n-octylamine, di-n-decylamino, dilaurylamine, bis - (2-methylcyclohexylmethyl)amine, N-methyllaurylamine, N-benzyllaurylamine, tri-n-octylamine, tri-laurylamine, N-methyldilaurylamine, N-butyl-didodecenylamine, and the like.

The organic solvent used in the extractant of this invention is substantially water-immiscible and should be maintained in liquid phase during extract. Representative organic solvents which can be employed include hydrocarbons such as kerosene, diesel fuel, hexane, heptane, cyclohexane, octane, methylcyclohexane, various highly branched paraffins, such as the "Soltrols" supplied by Phillips Petroleum Company, and the like. Aromatic hydrocarbon solvents can also be used including benzene, toluene, xylene, and commercial aromatic petroleum fractions. Chlorinated solvents can also be used such as chloroform, carbon tetrachloride and the like. These solvents can contain up to 10 volume percent of a long chain alcohol such as N-decyl alcohol to improve phase separation. The use of such material is disclosed by Brown et al., 2,877,250.

The process of this invention can be used for the recovery of molybdenum from many different types of acid solutions obtained during extract of uranium containing ores and the like. For example, acid leach liquors or acidified carbonate leach liquor can be treated as can such other acid solutions as acidified molybdenum strip solutions, acidified roast quench solutions and acidified concentrated phases such as result from the acetone treatment of carbonate leach liquors and the like.

In carrying out the process of this invention, the acid solution of molybdenum to be treated should have a pH below 3.0. Preferably, the pH lies between 1.5 and 3.0, but solutions having a pH below 1.5 can also be treated if desired. Many of these solutions will contain dissolved uranium and vanadium in addition to the molybdenum values described earlier. When these solutions are contacted with the extractant of this invention, only a small portion of the uranium values will be removed by the extractant. On the other hand, practically all of the molybdenum will be removed by the extractant, and large amounts of the vanadium will also be removed. If it is desired to minimize the amount of vanadium extracted, one can selectively reduce the valence of the vanadium present to the trivalent state by means of such reducing agents as sulfur dioxide. When the valence of the vanadium is reduced to the trivalent state prior to contact with the extractant of this invention, the extraction of the vanadium is not completely eliminated, but as shown hereinafter in the examples, is minimized.

As described earlier, the extractant will contain a solvent, preferably a hydrocarbon, an amine or quaternary ammonium compound of one of the above formulas, and at least one of the ethers, of the above formula.

Some specific examples of ethers which can be employed are: diethylene glycol di-n-butyl ether, diethylene glycol mono-n-pentyl ether, diethylene glycol mono-hexyl ether, diethylene glycol mono-sec-butyl ether, diethylene glycol di-tert-pentyl ether, ethylene glycol mono-hexyl ether, ethylene glycol di-n-butyl ether, ethylene glycol di-sec-pentyl ether, and the like.

Of the above ethers, diethylene glycol di-n-butyl ether (dibutyl carbitol), and the monohexyl ether of ethylene glycol (hexyl Cellosolve) are preferred. The specific composition will depend, of course, on the particular solvent and particular amine being used. Generally, the amine or quaternary maximum compound-solvent mixture will contain from about 2 to about 15 percent by volume of the amine or quaternary ammonium compound, preferably about 10 percent on the same basis. The amount of ether present will generally be such that the ether/amine or quaternary ammonium compound volume ratio will lie within the range of from 1.5/1 to 10/1.

The amount of extractant which is contacted with the acid molybdenum solution will also be determined, to a large extent, on the concentration of the molybdenum solution and the amount of amine or quaternary present in the extractant. By the same token, the extraction process can be carried out as a single stage or multiple stage extraction, using either batch or continuous procedures. The number of stages employed will again depend upon the concentrations of both the acid molybdenum solution and the extractant solution being used. Generally, the volume ratio of acid molybdenum solution/organic extractant will range from 5/1 to 50/1, and preferably 5/1 to 15/1. The more concentrated the acid molybdenum solution is, the lower the ratio of acid molybdenum solution/extractant will be.

Following the contacting of the acid solution with the extractant, the loaded or enriched extractant phase will be separated from the depleted or raffinate phase in a conventional manner as normally used in solvent extraction processes. The raffinate phase can be treated for recovery of other values if desired, or in some cases, it may be reprocessed for reuse in uranium leach circuits. The loaded extractant phase is then treated or stripped of its molybdenum content. In most cases, the loaded extractant will also contain some vanadium, and these vanadium values will also be removed by the stripping procedure. In stripping the loaded extractant, this organic phase is contacted with a concentrated aqueous solution of inorganic salts, and it is preferred that at least one salt be present to maintain the pH of the stripping solution above 5. These stripping solutions generally comprise aqueous solutions of salts of the alkali metals (including ammonium salts), e.g., chlorides, carbonates, sulfates, nitrates, fluorides, hydroxides and phosphates of sodium, potassium and ammonium. The concentration of such solutions will generally be above 0.5 molar with respect to the dissolved salt, preferably above 1.0 molar. Solutions of such salts as ammonium nitrate, ammonium fluoride, sodium chloride, sodium carbonate and the like work very satisfactorily. A preferred stripping solution is one which contains both dissolved sodium chloride and sodium carbonate. These preferred stripping solutions will generally contain from 30 to 150 grams per liter sodium chloride and from 25 to 100 grams per liter sodium carbonate. In effecting the stripping, the volume ratio of stripping solution to loaded organic extractant will generally range from 1.5/1 to 10/1.

The final recovery of molybdenum from the stripping solution can be carried out by conventional procedures. For example, the molybdenum can be precipitated as the sulfide by treating the strip solution, after acidification, with sodium sulfide. The molybdenum can also be precipitated as calcium molybdate by treating the strip solution with lime. Treatment of the strip solution with ammonia can also be used to bring about precipitation of ammonium molybdate.

As one further feature of this invention, we can recover molybdenum, as described earlier, from the acidified acetone solution resulting from the acetone treatment of uranium and molybdenum-containing carbonate leach liquor. It has not been reported that this source of molybdenum has been treated for recovery of molybdenum values by means of amine extractants. While the primary feature of this invention is the addition of a selected ether to prevent amine-molybdenum complex from precipitating out, the treatment of the acetone upper phase with the amine extractants in the absence of the added ether has not been reported. The application of an amine extraction to this particular molybdenum-containing phase contains certain economies in operation. As described in U.S. 2,953,432 of J. L. Hart and R. E. Reusser, uranium values can be concentrated in the aqueous phase by addition of certain organic solvents, such as acetone, to carbonate leach liquors containing dissolved uranium and other metal values. Not only is the uranium concentrated in the aqueous phase, but approximately 50 percent of the molybdenum to the upper phase. By applying the present process to the upper phase, we can recover the molybdenum present without having to resort to further treatment of the raffinate for recovery of large amounts of uranium. We also effect a rough separation between large amounts of molybdenum and uranium.

The following specific examples are intended to illustrate the advantages of this process, but it is not intended that the invention be limited to the embodiments therein.

*Example I*

A run was carried out in which an acid molybdenum-containing solution was solvent extracted with a kerosene solution of a quaternary ammonium compound.

The acid molybdenum-containing solution resulted from the acetone extraction of commercial pregnant uranium carbonate leach liquor. The treatment of the pregnant liquor with acetone was carried out according to the process of U.S. 2,953,432. The upper phase of the two phase mixture which resulted was then separated off, and the acetone was distilled off of this acetone-aqueous mixture. The resulting aqueous solution had the following analysis:

ANALYSIS

| | G./l. |
|---|---|
| $U_3O_8$ | 0.55 |
| Mo | 1.3 |
| Se | 0.26 |
| $Na_2CO_3$ | 12.99 |
| $NaHCO_3$ | 10.86 |
| $Na_2SO_4$ | 26.26 |
| $V_2O_5$ | 0.2 | pH, 9.6.

This basic solution was then acidified to a pH of 2.85 with sulfuric acid. The resultant acid solution was then extracted with a 10 percent by volume solution of Aliquat 336 in kerosene. Aliquat 336 is a 73–77 percent solution of tricaprylyl monomethyl ammonium chloride in isopropyl alcohol sold by General Mills Chemical Division, Kankakee, Illinois. One volume of quaternary-kerosene solution was contacted with 8 volumes of the acidified aqueous molybdenum solution. The raffinate from the one stage solvent extraction contained 0.060 g./l. $U_3O_8$, 0.003 g./l. Mo and 0 g./l. $V_2O_5$.

It was attempted to separate the molybdenum from the loaded organic extractant by contacting 50 ml. extractant with three 10 ml. portions of an aqueous solution containing 250 g./l. $NH_4Cl$ and 20 g./l. $NH_4OH$, then with four 10 ml. portions of an aqueous solution containing 50 g./l. $(NH_4)_2CO_3$. Stripping was not complete due to precipitation of solid molybdenum/amine complex and attendant emulsion formation.

Seven separate two-stage extractions of the same aqueous solution were carried out, except that the aqueous solution had been acidified to a pH of 2.5, and 1 volume of quaternary-kerosene solution per 12 volumes of aqueous-molybdenum solution was used. These extractions were carried in separatory funnels. The following results are an average for these runs.

RAFFINATES

| | Stage 1 | Stage 2 |
|---|---|---|
| G./l. $U_3O_8$ | 0.55 | 0.47 |
| G./l. Mo | 0.01 | 0.003 |

This represents 14.5 percent extraction of $U_3O_8$ and 99+ percent extraction of molybdenum.

It was attempted to separate the molybdenum from the loaded extract by treating 35 ml. of the loaded extractant with 35 ml. of hot aqueous solution containing 50 g./l. of $Na_2CO_3$ and 15 g./l. $NaHCO_3$ followed by contact 4 times with 17.5 ml. of hot aqueous solution containing 250 g./l. $NH_4NO_3$ and 1 time with 17.5 ml. of the $NH_4NO_3$ solution plus 3.4 ml. concentrated $HNO_3$. Stripping was unsuccessful due to molybdenum/amine complex precipitation.

*Example II*

A series of runs was carried out in which various ethers and ketones were added to an amine-kerosene extractant which was used to extract acid solutions of molybdenum. The amine used in the extracting solution was Amine 9D–178, a product of the Rohm and Haas Company. This amine is a mixture of highly branched, unsaturated, secondary aliphatic amines having an average molecular weight of 351–393 and having a formula:

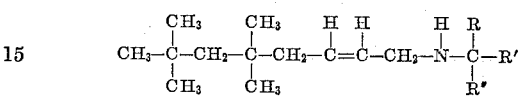

wherein R+R" are alkyl groups totaling 11 to 14 carbon atoms. In these runs, successive 50 ml. batches of acidified molybdenum solution were treated with 5 to 11 ml. volume of a mixture of Amine 9D–178, kerosene, and the candidate ketone or ether. The number of 50 ml. batches of aqueous solution treated when solid molybdenum/amine complex formation resulted was then recorded.

The acidified aqueous molybdenum solution used in these runs was a solution resulting from the water leaching of roasted sodium diuranate (yellow cake) which had been previously solvent extracted for vanadium removal and then acidified to a pH of 2.8. Prior to acidification with sulfuric acid, the solution contained 1.1 g./l. Mo, 4.11 g./l. $V_2O_5$, 11.0 g./l. $Na_2CO_3$ and about 50 g./l. $NaHCO_3$. After acidification, the solution contained 1.10 g./l. Mo, 4.11 g./l. $V_2O_5$ and had a pH of 2.8. The results of these tests are expressed in Table I, Runs 1 to 9. The larger number of batches of Mo containing solution that were treated in Runs 4 to 7 indicate the preferred range of ether to an amine is the volume ratio of from 10 to 1 down to 2 to 1.

*Example IIIA*

The acidified aqueous molybdenum solution of Example II was treated with 10 ml. of an extractant comprising 85 volume percent kerosene, 10 volume percent Aliquat 336 and 5 volume percent n-decyl alcohol. Solid molybdenum/amine complex formed almost immediately. The organic phase, containing the solvent, was separated off and to the 10 ml. of organic was added 3 ml. of n-hexyl Cellosolve. The solid dissolved immediately. The calculated composition of the extractant after addition of the ether was 65.4 volume percent kerosene, 7.7 volume percent quaternary ammonium compound (Aliquat 336), 3.9 volume percent n-decyl alcohol and 23 volume percent n-hexyl Cellosolve. Thus, the volume ratio of ether to quaternary was approximately 3/1.

TABLE I

| Run No. | Volume extractant, ml. | Candidate ketone or ether* | Vol. Percent amine* | Vol. Percent ether or ketone | Vol. Percent kerosene | Number of 50 ml. batches treated when solids became evident | | | | |
|---|---|---|---|---|---|---|---|---|---|---|
| | | | | | | 1 | 2 | 3 | 4 | 5 |
| 1 | 5.0 | Dibutyl carbitol | 10 | | 64.3 | | X | | | |
| 2 | 5.0 | ___do___ | 7.1 | 28.6 | 64.3 | | X | | | |
| 3 | 7.1 | ___do___ | 7.0 | 30.0 | 63.0 | X | | | | |
| 4 | 8.3 | ___do___ | 6.0 | 40.0 | 54.0 | | | | X | |
| 5 | 5.0 | ___do___ | 5.0 | 50.0 | 45.0 | | | | | X |
| 6 | 7.5 | ___do___ | 3.3 | 33.3 | 63.4 | | | X | | |
| 7 | 10.0 | Dibutyl Cellosolve | 5.0 | 50.0 | 45.0 | | | X | | |
| 8 | 10.0 | Diethyl ketone | 5.0 | 50.0 | 45.0 | X | | | | |
| 9 | 10.0 | Methyl isobutyl ketone | 5.0 | 50.0 | 45.0 | X | | | | |

*Dibutyl carbitol=diethylene glycol dibutyl ether.
Dibutyl Cellosolve=ethylene glycol dibutyl ether.

*Example IIIB*

A series of runs was carried out according to the procedure of Example II and in which the amount of n-hexyl Cellosolve in the ether-amine-kerosene extractant was varied. Amine 9D–178 identified in Example II was the amine used. The results of these tests are given in Table II. The larger number of batches of Mo-containing solution that were treated in Runs 15 to 18 indicate the preferred range of this ether to an amine is in the volume ratio of from 10 to 1 down to 2 to 1.

*Example IV*

The acidified molybdenum-containing solution of Example II, analyzing 1.0 g./l. Mo and 4.11 g./l. $V_2O_5$ was solvent extracted with an extractant comprising 28.6 volume percent n-hexyl Cellosolve, 7.2 volume percent Amine 9D–178 and 64.2 volume percent kerosene. Three stage extraction was employed in this run using an extractant to aqueous volume ratio of 1/20. The results were as follows:

|  | Analysis, g./l. | |
| --- | --- | --- |
|  | Mo | $V_2O_5$ |
| Solution before extraction | 1.10 | 4.11 |
| Raffinate from 2nd stage | 0.024 | 0.38 |
| Raffinate from 3rd stage | 0.918 | 0.30 |

No trouble was encountered with solid molybdenum-amine complex formation in this run.

The loaded organic was then stripped by contacting it with an aqueous solution containing 100 g./l. NaCl and 30 g./l. $Na_2CO_3$ at a ratio of 9.75 volumes of aqueous solution to 1 volume of loaded organic solution. The aqueous solution analyzed 19.6 g./l. Mo after separating the phases.

TABLE II

| Run No. | Volume extractant, ml. | Extractant composition | | | Number of 50 ml. batches treated when solids became evident | | | | |
| --- | --- | --- | --- | --- | --- | --- | --- | --- | --- |
|  |  | Vol. percent amine | Vol. percent n-Hexyl Cellosolve | Vol. percent kerosene | 1 | 2 | 3 | 4 | 5 |
| 12 | 5.0 | 10.0 | 0.0 | 90.0 | X |  |  |  |  |
| 13 | 5.2 | 9.6 | 3.8 | 86.6 | X |  |  |  |  |
| 14 | 5.5 | 9.1 | 9.1 | 81.8 | X |  |  |  |  |
| 15 | 6.0 | 8.3 | 16.7 | 75.0 |  |  |  | X |  |
| 16 | 6.5 | 7.7 | 23.0 | 69.3 |  |  |  |  | X |
| 17 | 7.5 | 6.6 | 33.4 | 60.0 |  |  |  |  | X |
| 18 | 10.0 | 5.0 | 50.0 | 45.0 |  |  |  |  | X |

*Example V*

The loaded organic extractant of Example IIIB was composited and stripped by contacting the extractant with an aqueous solution containing 100 g./l. NaCl and 30 g./l. $Na_2CO_3$. The volume ratio of aqueous solution to extractant was 20/30. The aqueous phase after phase separation was analyzed and found to contain 18.0 g./l. Mo, 21.3 g./l. $V_2O_5$ and no $U_3O_8$.

Molybdenum sulfide was then precipitated from this strip solution in the following manner. Five grams of sodium sulfide ($Na_2S \cdot 5H_2O$) was added to 60 ml. of the aqueous solution, the sulfuric acid was added to give a blue color to Congo red paper (pH 3.5–5.0). This caused precipitation of 97+ percent of the molybdenum present in the aqueous solution. The washed, dry cake analyzed 31 percent Mo and 6.4 percent $V_2O_5$.

*Example VI*

Another series of runs was carried out in which a previously extracted vanadium-rich stream from yellow cake roasting as described in Example II containing 1.4 g./l. Mo and 3.7 g./l. $V_2O_5$ was extracted with the organic extractant of Example IV at various pH's. The organic extractant used contained 28.6 volume percent n-hexyl Cellosolve, 7.2 volume percent Amine 9D–178 and 64.2 volume percent kerosene. Three stage extraction was employed, using a ratio of 1 volume of organic extractant to 14 volumes of aqueous molybdenum solution.

EXTRACTION RESULTS
[Figures are raffinate analyses]

| Aqueous solution, pH | Stage 1, g./l. | | Stage 2, g./l. | | Stage 3, g./l. | |
| --- | --- | --- | --- | --- | --- | --- |
|  | Mo | $V_2O_5$ | Mo | $V_2O_5$ | Mo | $V_2O_5$ |
| 2.9 | 0.73 | 3.7 | 0.55 | 3.3 | 0.13 | 1.0 |
| 2.75 | (¹) | (¹) | (¹) | (¹) | 0.04 | None |
| 2.00 | 0.12 | 3.3 | 0.11 | 1.5 | 0.02 | 0.7 |
| 1.00 | 0.17 | 3.0 | 0.12 | 0.9 | 0.11 | 0.5 |

¹ Not determined.

The loaded organic composite from these runs analyzed 11.5 g./l. Mo and 31.4 g./l. $V_2O_5$.

This loaded organic was stripped in 3 stages with an aqueous solution containing 100 g./l. NaCl and 60 g./l. $Na_2CO_3$, using a ratio of organic to stripping solution of 2.7/1. The aqueous phase from this stripping had a pH of 6.2 and analyzed 30.8 g./l. Mo and 76.5 g./l. $V_2O_5$.

*Example VII*

A series of runs was made in which an aqueous, acidic solution containing molybdenum was extracted according to the process of this invention.

In this series, the extractant used was made up by mixing 25 ml. of a 10 percent by volume solution of Amine 9D–178 in kerosene with 8 ml. of n-hexyl Cellosolve. This extractant was then contacted in 3 stages with a solution similar to that of Example II except that the vanadium had been reduced to the trivalent state with $SO_2$, containing 1.9 g./l. vanadium (expressed as $V_2O_5$) and approximately 0.7 g./l. Mo, and having a pH of approximately 2.5. The results were as follows:

| Aqueous/organic extractant ratio | Raffinate from 3rd stage, g./l. | |
| --- | --- | --- |
|  | $V_2O_5$ | Mo |
| 14 | 1.9 | nil |
| 20 | (¹) | 0.05 |
| 60 | 1.9 | ² 0.12 |
| 60 | 1.9 | ² 0.10 |
| 40 | 1.9 | 0.08 |

¹ Not determined.
² Some amine-molybdenum complex formed at these ratios.

Using a similar solution containing 3.6 g./l. $V_2O_5$ and 0.98 g./l. Mo, the following results were obtained with the same extractant:

Aqueous/organic extractant ratio:      Raffinate, g./l. Mo
45 ———————————————————— 0.32
40 ———————————————————— 0.30

The above prepared loaded extractants were stripped with an aqueous solution containing 100 g./l. NaCl and 60 g./l. Na$_2$CO$_3$ at an aqueous to organic ratio of 0.75. The resulting aqueous solution contained 38.3 g./l. Mo and 2.0 g./l. V$_2$O$_5$.

Various modifications and alterations of this invention will become apparent to those skilled in the art without departing from the scope and spirit of the invention, and it should be understood that the latter is not necessarily limited to the aforementioned discussion.

What is claimed is:

1. In a process for the recovery of metal values from a pregnant aqueous acidic solution containing said values and molybdenum values, which comprises contacting said solution with an extractant comprising a substantially water-immiscible organic diluent and an organonitrogen compound selected from the group consisting of compounds represented by the formulas:

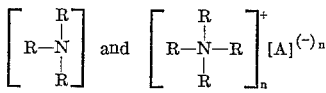

where R is a hydrocarbon radical selected from the group consisting of alkyl, alkenyl, cycloalkyl, cycloalkenyl, and aryl radicals, aralkyl, alkylcycloalkyl, cycloalkylalkenyl, arylcycloalkyl, and cycloalkenylaryl; wherein at least one of said R radicals has at least 8 carbon atoms, and is an alkyl or alkenyl radical; the total number of carbon atoms in the sum of said R radicals being in the range between 11 and 40; A is an anion selected from the group consisting of chloride, bromide, iodide, fluoride, hydroxide, sulfate, phosphate, acetate, nitrate, benzoate, salicylate; and wherein $n$ is an integer equal to the valence of the anion A, whereby metal values are extracted into the organic phase, the metal-loaded organic phase is separated from the remaining acidic solution, and extracted metal values are recovered from said metal-loaded organic phase, the improvement comprising: maintaining the pH of said molybdenum-containing acidic solution below 3.0 by the addition of a mineral acid, if necessary; and incorporating into said extractant, prior to contacting said solution, an ether of the formula:

wherein $m$ is an integer selected from the group consisting of 1 and 2, R is a 4 to 6 carbon alkyl radical, and R' is selected from the group consisting of hydrogen and a 4 to 6 carbon alkyl radical.

2. The process according to claim 1 wherein said ether is selected from the group consisting of diethylene glycol, di-n-butyl ether, diethylene glycol mono-n-pentyl ether, diethylene glycol mono-hexyl ether, diethylene glycol mono-sec-butyl ether, diethylene glycol di-tert-pentyl ether, ethylene glycol mono-hexyl ether, ethylene glycol di-n-butyl ether, ethylene glycol, and di-sec-pentyl ether.

3. The process according to claim 1 wherein said organic diluent is selected from the group consisting of kerosene, diesel fuel, hexane, heptane, cyclohexane, octane, methylcyclohexane, benzene, toluene, xylene, chloroform, carbon tetrachloride, and mixtures thereof.

4. The process according to claim 1 wherein the volume ratio of acidic molybdenum solution/organic extractant is in the range from 50/1 to 5/1.

5. The process according to claim 1 wherein the extractant comprises from about 2 to about 15 volume percent of said organonitrogen compound.

6. The process according to claim 1 wherein the volume ratio of ether/organonitrogen compound is in the range of 0.5/1 to 10/1.

7. In a process for the recovery of metal values from a pregnant aqueous acidic solution containing said values and molybdenum values, which comprises contacting said solution with an extractant comprising kerosene and an aliphatic amine, whereby metal values are extracted into the kerosene phase, the metal-loaded kerosene phase is separated from the remaining acidic solution, and extracted metal values are recovered from said metals-kerosene phase, the improvement comprising: maintaining the pH of said molybdenum containing solution below 3.0 by the addition of a mineral acid as necessary; and incorporating into said extractant prior to contacting said solution, an ether comprising dibutyl carbitol.

8. In a process for the recovery of metal values from a pregnant aqueous acidic solution containing said values and molybdenum values, which comprises contacting said solution with an extractant comprising kerosene and an aliphatic amine, whereby metal values are extracted into the kerosene phase, the metal-loaded kerosene phase is separated from the remaining acidic solution, and extracted metal values are recovered from said metals-kerosene phase, the improvement comprising: maintaining the pH of said molybdenum containing solution below 3.0 by the addition of a mineral acid as necessary; and incorporating into said extractant prior to contacting said solution, an ether comprising hexyl Cellosolve.

References Cited by the Examiner

UNITED STATES PATENTS

| | | | |
|---|---|---|---|
| 2,819,944 | 1/1958 | Wibbles et al. | 23—14.5 |
| 3,083,076 | 3/1963 | Drabnick et al. | 23—14.5 |

OTHER REFERENCES

AEC Document ORNL–2269, Progress Report on Raw Materials, February 1957, pp. 12–22.

CARL D. QUARFORTH, *Primary Examiner.*

REUBEN EPSTEIN, *Examiner.*